US012605728B2

(12) United States Patent
Petit et al.

(10) Patent No.: US 12,605,728 B2
(45) Date of Patent: Apr. 21, 2026

(54) PRIMING CAP FOR A DEVICE FOR DISPENSING A FLUID PRODUCT

(71) Applicant: APTAR FRANCE SAS, Le Neubourg (FR)

(72) Inventors: Ludovic Petit, Vitot (FR); Sébastien Michaux, Le Petit Quevilly (FR); Fabien Adam, Aviron (FR); Yann Ghafourzadeh, Congers, NY (US)

(73) Assignee: APTAR FRANCE SAS, Le Neubourg (FR)

( * ) Notice: Subject to any disclaimer, the term of this patent is extended or adjusted under 35 U.S.C. 154(b) by 177 days.

(21) Appl. No.: 18/706,939

(22) PCT Filed: Nov. 2, 2022

(86) PCT No.: PCT/FR2022/052058
§ 371 (c)(1),
(2) Date: May 2, 2024

(87) PCT Pub. No.: WO2023/079235
PCT Pub. Date: May 11, 2023

(65) Prior Publication Data

US 2024/0424510 A1 Dec. 26, 2024

(30) Foreign Application Priority Data

Nov. 4, 2021 (FR) ........................................ 2111725

(51) Int. Cl.
*B05B 11/00* (2023.01)
*B05B 11/10* (2023.01)

(52) U.S. Cl.
CPC ...... *B05B 11/0032* (2013.01); *B05B 11/1061* (2023.01)

(58) Field of Classification Search
CPC .. A61M 15/08; A61M 15/0025; A61M 11/00; A61M 11/006; A61M 11/007;
(Continued)

(56) References Cited

U.S. PATENT DOCUMENTS 3,938,711 A * 2/1976 Ewald ................. B05B 11/1047 222/209
6,578,741 B2 * 6/2003 Ritsche ............... B05B 11/1061 222/642

(Continued)

FOREIGN PATENT DOCUMENTS

EP 3 468 532 A1 4/2019
JP 03-178671 A 8/1991
JP 2013-094407 A 5/2013

OTHER PUBLICATIONS

International Search Report for PCT/FR2022/052058 dated Jan. 30, 2023.

(Continued)

*Primary Examiner* — Paul R Durand
*Assistant Examiner* — Randall A Gruby
(74) *Attorney, Agent, or Firm* — Sughrue Mion, PLLC

(57) ABSTRACT

Priming cap intended to cover, in a closure position, a dispensing head of a device for dispensing fluid product, the dispensing head having an axial end wall provided with a dispensing orifice, the priming cap having a mechanism for trapping fluid in order, in the closure position, to receive and retain fluid that is dispensed through the dispensing orifice during actuations of priming the dispensing device.

9 Claims, 1 Drawing Sheet

Figure 1:
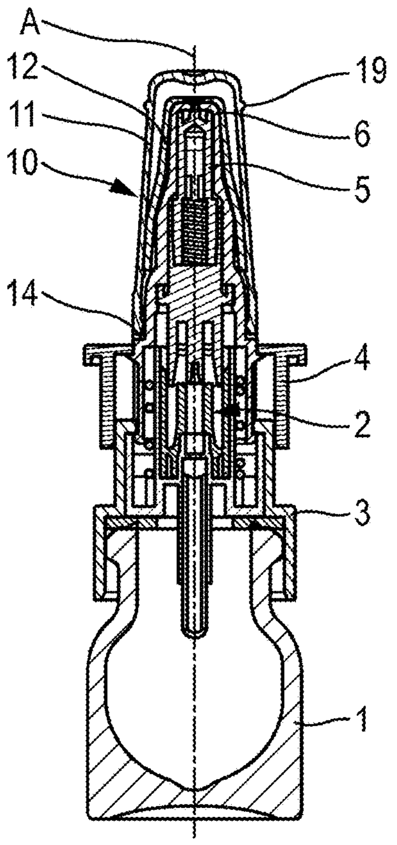

(58) Field of Classification Search
CPC ..... A61M 39/20; A61M 3/0279; B65D 51/28; B65D 51/24; B65D 51/1616; B65D 51/1661; B05B 11/00; B05B 11/0032; B05B 11/1001–1014; B05B 11/1047
See application file for complete search history.

(56) References Cited

U.S. PATENT DOCUMENTS

| | | | | |
|---|---|---|---|---|
| 7,766,897 | B2 * | 8/2010 | Ramsey | A61M 39/20 604/533 |
| 9,101,730 | B2 * | 8/2015 | Greiner-Perth | B05B 11/107 |
| 9,151,281 | B2 * | 10/2015 | Donnette | B05B 11/0075 |
| 12,303,635 | B2 * | 5/2025 | Dhuppad | A61K 31/335 |
| 2002/0066752 | A1 | 6/2002 | Ritsche et al. | |
| 2015/0298893 | A1 | 10/2015 | Welp | |

OTHER PUBLICATIONS

International Preliminary Report on Patentability (with translation of Written Opinion) dated Oct. 9, 2023 issued in International Application No. PCT/FR2022/052058.

* cited by examiner

PRIMING CAP FOR A DEVICE FOR DISPENSING A FLUID PRODUCT

CROSS REFERENCE TO RELATED APPLICATIONS

This application is a National Stage of International Application No. PCT/FR2022/052058 filed Nov. 2, 2022, claiming priority based on French Patent Application No. 2111725 filed Nov. 4, 2021.

The present invention relates to a priming cap for a device for dispensing a fluid product, in particular of the nasal spray type, as well as such a dispensing device comprising such a priming cap.

It is known, in the prior art, to use a removable cap to block the dispensing orifice of such a dispenser. Such caps are, in particular, described in documents WO0061454, WO9800354, EP0131501, EP0775530, WO2007009872 and WO2008142357.

This type of removable cap, when it is in the closing position, protects and/or blocks the dispensing orifice of the dispensing head.

Generally, a device for dispensing a fluid product, in particular if it comprises a pump, must be primed before use, i. e. that the air contained in the dosing chamber must be replaced by the fluid product. Thus can require several actuations of the device, which therefore generate a partial dispensing of the fluid. In particular, for certain types of fluid product, such as medicines, it must be ensured that from the first dose dispensed, the dosing is complete and precise. In certain cases, it can be necessary to do up to five priming actuations. This is done by removing the protective cap used to block and protect the dispensing orifice, then by actuating the device in the air, the number of times of required to guarantee a complete dose to the first actual use of the device. According to the nature of the fluid product, these priming actuations in the air cannot be desirable, even dangerous.

Documents US20020066752, US20150298893, JP403178671, JP2013094407 and EP3468532 describe other caps of the prior art.

The present invention aims to provide a priming cap which makes it possible to perform priming actuations of the dispensing device without removing the cap from its closing position.

In particular, the present invention aims to provide such a priming cap which receives and retains the fluid dispensed during priming actuations.

The present invention also aims to provide such a priming cap which is simple and inexpensive to manufacture and to assemble.

The present invention therefore aims for a priming cap intended to cover in a closing position, a dispensing head of a device for dispensing a fluid product, said dispensing head comprising an axial end wall provided with a dispensing orifice, said priming cap comprising means for trapping fluid to, in the closing position, receive and retain fluid dispensed through said dispensing orifice during actuations of priming said dispensing device.

Advantageously, said priming cap comprises a side wall provided with fixing means to hold said priming cap on said dispensing head in the closing position.

Advantageously, the priming cap comprises a contact section intended to engage with an axial end wall of said dispensing head which comprises said dispensing orifice.

According to an advantageous first embodiment, said priming cap comprises an upper axial wall connected to a side wall, said trapping means comprising an internal sleeve fixed in said side wall and defining a trapping space between said internal sleeve and said priming cap.

Advantageously, said internal sleeve comprises a substantially radial bottom axial wall comprising an opening, said bottom axial wall being positioned in the closing position of said priming cap on said axial end wall of said dispensing head, with said opening disposed facing said dispensing orifice.

Advantageously, said upper axial wall comprises an internal profile, in particular dome-shaped, adapted to guide the fluid exiting from said dispensing orifice to the sides to avoid it directly returning onto said dispensing orifice.

Advantageously, said trapping space extends laterally around an upper part of said internal sleeve, which enables the trapped fluid to flow and to remain trapped in a lower part of said trapping space.

Advantageously, said side wall of said priming cap is at least partially transparent or translucent to make it possible to see the fluid contained in said trapping space after the priming actuations.

Advantageously, said side wall comprises an external marker, such as a ridge, forming a priming control.

According to another advantageous embodiment, said priming cap comprises a side wall, an upper axis end of which is open, said trapping means comprising a hollow cap fixed on said upper axial end of said side wall.

According to a first advantageous variant, said hollow cap contains an insert, a trapping space being defined between said insert and the bottom of said hollow cap.

Advantageously, said insert is porous, and can absorb the fluid dispensed during priming actuations.

Advantageously, an axial passage is provided in said insert to facilitate the transfer of the fluid to said trapping space.

According to an advantageous second variant, said hollow cap contains a one-directional valve comprising a membrane provided with a slot which opens when the fluid is dispensed through said dispensing orifice during priming actuations, a trapping space being defined between said one-directional valve and the bottom of said hollow cap.

The present invention also aims for a dispensing head of a device for dispensing a fluid product, comprising a priming cap such as described above.

The present invention also aims for a device for dispensing a fluid product, comprising a fluid product reservoir, a dispensing member, such as a pump mounted on said reservoir or a piston sliding in said reservoir, and a dispensing head provided with a dispensing orifice, comprising a priming cap such as described above.

Figure 2:
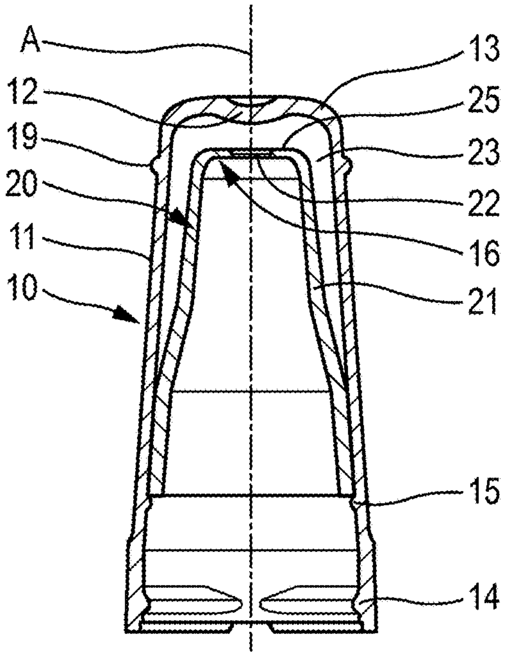

Other features and advantages of the present invention will appear during the detailed description below of several advantageous embodiments, given as non-limiting examples, in reference to the accompanying drawings, wherein:

FIG. 1 is a schematic, cross-sectional view of a device for dispensing a fluid product comprising a priming cap according to an advantageous embodiment, in the closing position on a nasal dispensing head, FIG. 2 is a schematic, cross-sectional view of the cap of FIG. 1, and FIGS. 3 to 5 are views similar to that of FIG. 2, showing three other embodiments of the priming cap.

In the description below, the terms “axial” and “radial” refer to the longitudinal central axis A of the device. The terms “top”, “bottom”, “upper”, and “lower” refer to the straight position represented in the drawings.

FIG. 1 represents an example of a device for dispensing fluid product, to which the present invention applies. This device comprises a reservoir 1 containing the fluid product, a pump 2 being mounted on the reservoir 1, in particular by means of a fixing ring 3. A dispensing head 4, provided with a dispensing orifice 6, is assembled on the pump 2 and serves to actuate the pump and to distribute a dose of fluid product upon each actuation. These different elements can naturally be produced differently from the example of FIG. 1.

Figure 3:
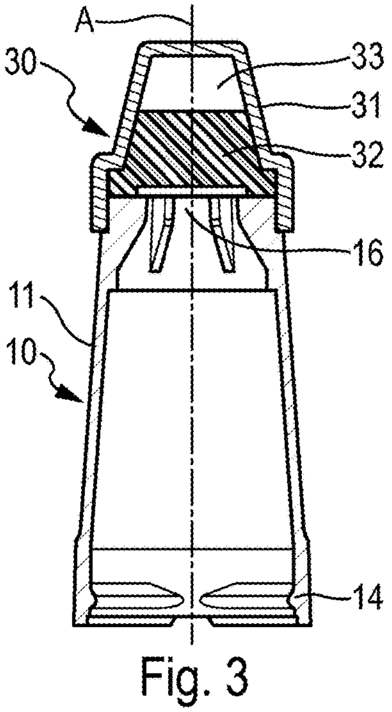
Figure 4:
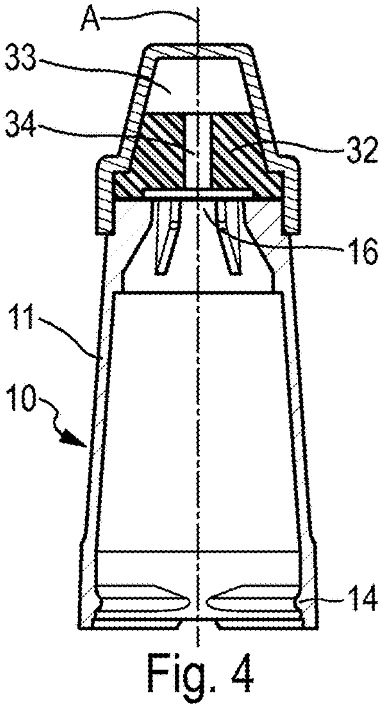
Figure 5:
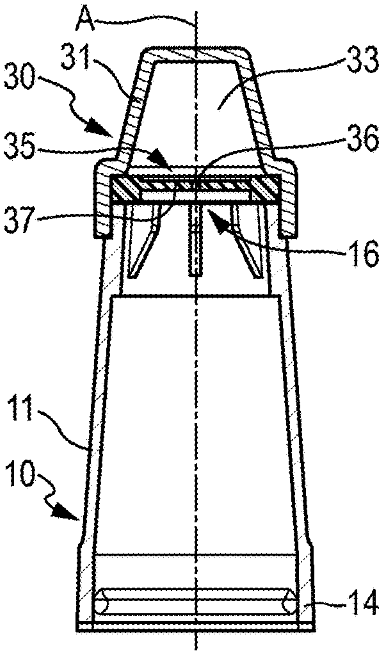

A priming cap 10 according to an advantageous first embodiment is represented in its closing position in FIG. 1 and in an isolated manner in FIG. 2. FIGS. 3 to 5 show other embodiments. This priming cap 10 comprises a side wall 11, advantageously at least partially conically-shaped, and therefore particularly well-adapted to a dispensing head 4 of the nasal type, provided with an extended nasal nozzle 5 intended to enter into a nostril in use, and comprising the dispensing orifice 6 at its upper axial end, seen in the orientation of FIG. 1.

The priming cap 10 can comprise fixing means 14 on its side wall 11, preferably at its lower axial edge, to hold the priming cap 10 in the closing position on the dispensing head 4. The means 14 for fixing the priming cap 10 on the dispensing head 4 can have any suitable shape. For example, the priming cap 10 can be fixed by snap-fitting, as illustrated in the drawings, or in a variant, be screwed.

In the closing position, the priming cap 10 comprises a contact section 16 intended to engage with the axial end wall of the dispensing head 4 which comprises the dispensing orifice 6, and means 20, 30 for trapping fluid, to receive and retain the fluid dispensed during actuations of priming the device.

According to a first embodiment, which can be seen in FIGS. 1 and 2, the priming cap 10 comprises an upper axial wall 13 connected to said side wall 11, and the trapping means 20 comprise an internal sleeve 21 fixed in the side wall 11 and defining a trapping space 23 between said internal sleeve and the cap 10.

The internal sleeve 21 comprises a substantially radial bottom axial wall 25 comprising an opening 22. The bottom axial wall 25 is positioned in the closing position of the cap on the axial end wall of the dispensing head 4 which comprises the dispensing orifice 6, with the opening 22 disposed facing the dispensing orifice 6. This bottom axial wall 25 and the opening 22 thus form the contact section 16 of the cap 10. When the fluid is dispensed during a priming actuation, it will pass through the opening 22 and enter into the trapping space 23.

Advantageously, the upper axial wall 13 of the priming cap 10 comprises an internal profile 12, for example dome-shaped, adapted to guide the fluid exiting from the dispensing orifice 6 to the sides to avoid it directly returning onto the dispensing orifice 6. Indeed, the fluid exits in the form of conical spray, and by coming into contact with the internal profile, the droplets of the spray are deviated radially outwards.

Advantageously, the internal sleeve 21 is sealingly fixed in the side wall 11, at suitable holding means 15.

Advantageously, the trapping space 23 extends laterally around the upper part of the internal sleeve 21, which enables the trapped fluid to flow and to remain trapped in the lower part of said trapping space 23. In this way, when the user removes the cap 10 from the dispensing head, after the priming actuations and before the use actuation, there is no risk of leakages of the trapped fluid, for example, through the opening 22 of the internal sleeve 21.

Advantageously, the side wall 11 of the priming cap 10 is at least partially transparent or translucent to make it possible to see the fluid contained in the trapping space 23 after the priming actuations.

Advantageously, the side wall 11 comprises an external marker 19, such as a ridge, forming a priming control. Thus, when the fluid level in the trapping space 23 reaches said external marker 19, the user knows that the device has been sufficiently primed, and that they can therefore remove the priming cap 10 to use the device.

FIGS. 3 to 5 represent other embodiments of the priming cap, wherein means for trapping liquid are different.

In these examples of FIGS. 3 to 5, the upper axial end of the side wall 11 of the priming cap 10 is open, and the trapping means 30 comprise a hollow cap 31 fixed on said upper axial end of the side wall 11 of the priming cap 10.

In the examples of FIGS. 3 and 4, this cap 31 contains an insert 32, the lower surface of which forms the contact section 16 of the cap 10. A trapping space 33 is defined axially above said insert, in the bottom of said hollow cap 31.

This insert 32 is advantageously porous, and can absorb the fluid dispensed during priming actuations. It can also guide this fluid, in particular by capillarity, to the trapping space 33.

In the example of FIG. 4, an axial passage 34 is provided in the insert 32 to facilitate the transfer of the fluid to the trapping space 33.

In the example of FIG. 5, the cap 31 contains a one-directional valve 35 defining the contact section 16 of the cap 10. This valve 35 can comprise a membrane 37 comprising a slot 36 in its centre, which opens when the fluid is dispensed through the dispensing orifice during priming actuations. A trapping space 33 is defined axially above said membrane, in the bottom of said hollow cap 31.

This one-directional valve 35 opens under the pressure of the fluid to let this fluid pass into the trapping space 33, and closes automatically to retain the fluid in this trapping space 33.

The hollow cap 31 of the embodiments of FIGS. 3 to 5 can also be at least partially transparent or translucent and comprise an external marker forming a priming control.

The present invention has been described above in reference to several advantageous embodiments of it, but it is clear that it is not limited to these embodiments. In particular, the shape of the cap, likewise the shape and the position of the means for trapping fluid can be different. Other modifications can be provided by a person skilled in the art without departing from the scope of the present invention, such as defined by the accompanying claims.

The invention claimed is:

1. A device for dispensing a fluid product, comprising a fluid product reservoir, a dispensing member, a dispensing head provided with a dispensing orifice, and a priming cap intended to cover, in a closing position, said dispensing head, said dispensing head comprising an axial end wall provided with a dispensing orifice, said priming cap comprising trapping means for trapping fluid to, in the closing position, receive and retain the fluid dispensed through said dispensing orifice during actuations of priming said dispensing device, said priming cap comprising an upper axial wall connected to a side wall, said trapping means comprising an internal sleeve fixed in said side wall and defining a trapping space between said internal sleeve and said priming cap, characterised in that said internal sleeve comprises a substantially radial bottom axial wall comprising an opening, said bottom axial wall being positioned in the closing position of said priming cap on said axial end wall of said dispensing head, with said opening disposed facing said dispensing orifice.

2. The device according to claim 1, wherein said side wall is provided with fixing means to hold said priming cap on said dispensing head in the closing position.

3. The device according to claim 1, comprising a contact section intended to engage with an axial end wall of said dispensing head which comprises said dispensing orifice.

4. The device according to claim 1, wherein said upper axial wall comprises an internal profile, in particular dome-shaped, adapted to guide the fluid exiting from said dispensing orifice to the sides to avoid it directly returning onto said dispensing orifice.

5. The device according to claim 1, wherein said trapping space extends laterally around an upper part of said internal sleeve, which enables the trapped fluid to flow and remain trapped in a lower part of said trapping space.

6. The device according to claim 1, wherein said side wall of said priming cap is at least partially transparent or translucent to make it possible to see the fluid contained in said trapping space after the priming actuations.

7. The device according to claim 6, wherein said side wall comprises an external marker forming a priming control.

8. The device according to claim 1, wherein said dispensing member is a pump mounted on said reservoir or a piston sliding in said reservoir.

9. The device according to claim 7, wherein said external marker is a ridge.

* * * * *